United States Patent [19]

Strong

[11] 4,298,094

[45] Nov. 3, 1981

[54] COLLAPSIBLE SAWHORSE

[76] Inventor: Munro L. Strong, San Fernando Way, San Francisco, Calif. 94127

[21] Appl. No.: 185,754

[22] Filed: Sep. 10, 1980

[51] Int. Cl.[3] .............................................. F16M 11/00

[52] U.S. Cl. .................................... 182/155; 182/153; 182/186; 182/226

[58] Field of Search ................ 182/155, 153, 181-186, 182/224-226

[56] References Cited

U.S. PATENT DOCUMENTS

| | | | |
|---|---|---|---|
| 343,829 | 6/1886 | Miller | 182/155 |
| 401,848 | 4/1889 | Miller | 182/155 |
| 1,224,893 | 5/1917 | Beckwith | 182/155 |
| 1,967,886 | 7/1934 | Johnson | 182/155 |
| 2,431,898 | 12/1947 | Witken | 182/155 |
| 3,637,045 | 1/1972 | Poffenbaugh | 182/155 |

*Primary Examiner*—Reinaldo P. Machado
*Attorney, Agent, or Firm*—Robert Charles Hill

[57] ABSTRACT

A collapsible sawhorse is provided with a beam and a pair of leg assemblies adapted to support the beam and to be collapsible to a stored position adjacent a surface of the beam. A doglike structure at one end of each of the leg members is adapted to be positionable within a locking hole depending from the underside of the beam.

6 Claims, 6 Drawing Figures

COLLAPSIBLE SAWHORSE

FIELD OF THE INVENTION

The present invention relates to a supporting device generally referred to as a sawhorse and more particularly to a sawhorse with legs which are collapsible and adapted to be stored adjacent to the supporting surface of the sawhorse while remaining attached to that surface.

SUMMARY OF THE INVENTION

A sawhorse is a working tool for many trades and crafts generally comprising a working or supporting surface with a pair of legs at each end adapted to elevate the working or supporting surface at a level of convenience for the user. Frequently sawhorses are used in pairs to provide a pair of working surfaces on which an object may be supported. In is simpliest form a sawhorse has legs and braces which are rigidly and permanently fixed to the supporting surface. With such a construction the sawhorse cannot usually be collapsed, intentionally or unintentionally, and for that reason the sawhorse sometimes takes up a considerable amount of space whether as a single unit or as pairs, even though pairs of sawhorses can sometimes be nested together.

It is desirable, for space saving and portability reasons, to have a sawhorse which can be easily collapsed when not in use and which can be easily transported from one place to another. Such a collapsible sawhorse must be easily erected to working condition, must be sturdy and dependably maintained in erected condition, easily collapsed when that is desired with its parts conveniently arranged in a stored condition.

The known prior art patents are as follows:

U.S. Pat. Nos. 640,922 issued Aug. 2, 1950 (Great Britain)

U.S. Pat. Nos. 2,544,989 issued Mar. 13, 1951

U.S. Pat. Nos. 2,639,197 issued May 19, 1953

U.S. Pat. Nos. 2,925,140 issued Feb. 16, 1960

Thomas U.S. Pat. No. (640,922) shows a cumbersome leg arrangement which involves a great deal of space protruding to the side of the sawhorse at all times whether in the upright position or collapsed. Thomas also lacks a locking mechanism and could inadvertently collapse.

Garibaldi U.S. Pat. No. (2,544,989) is another cumbersome structure. The support mechanisms 11 with their screw arrangements are just not practical.

Chelsea U.S. Pat. No. (3,639,197) is basically the same kind of support system found in a bridge table with knocked down supports 14 connecting the legs and the table surface and knock up supports 28 connecting the two legs at each end of the support surface.

Thielepate U.S. Pat. No. (2,925,140) has legs which rotate from beneath the sawhorse to above the sawhorse resulting in a deformity that is extremely cumbersome and in the way.

It is the primary object of the present invention to provide a new and improved collapsible sawhorse.

Another object of the present invention is an apparatus which will provide a rigid and rugged structure, generally known as a sawhorse, with a beam member, a pair of supporting leg members at each end of the beam with connection to the beam in a manner to permit the legs to be easily erected to supporting position and easily released intentionally to collapsed position.

A further object of the invention, in accord with the preceding object, is to provide a leg connection to the beam that will permit the legs to be easily and conveniently stored adjacent to the beam while remaining attached thereto.

Other objects and advantages of the invention will become apparent from the following description having reference to the accompanying drawings.

DETAILED DESCRIPTION OF THE PREFERRED EMBODIMENT

Figure 1:
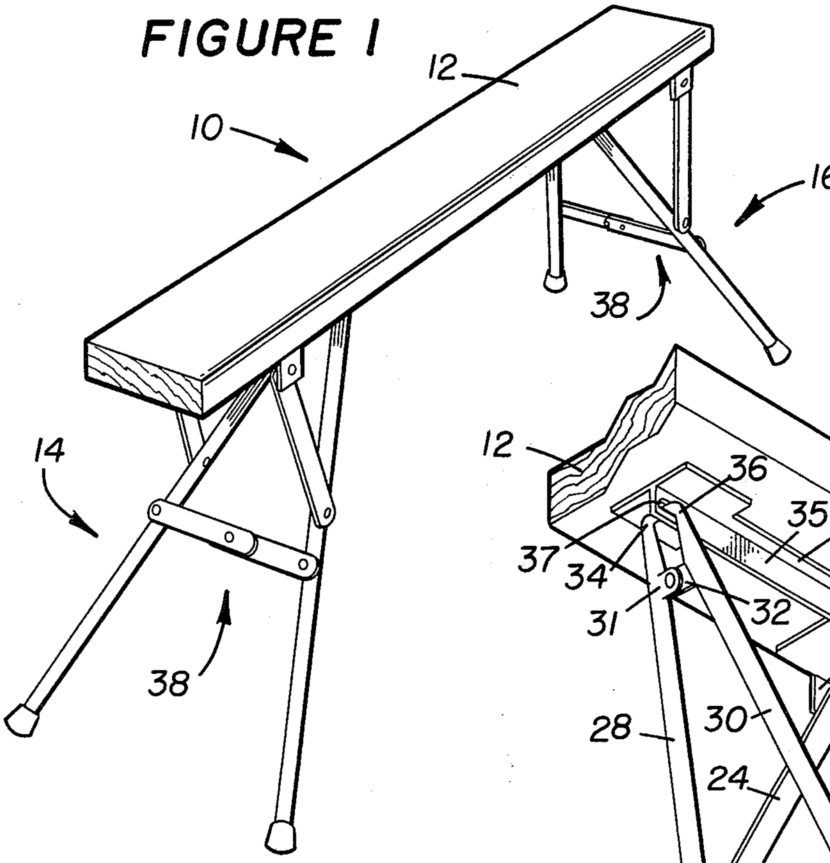
FIG. 1 is a perspective view of the present invention from above and to one side thereof.

FIG. 1 illustrates a sawhorse or the like generally designated 10 comprising a beam 12, frequently constructed of wood or the like, with leg assemblies 14 and 16 at opposite ends of the beam. The leg assemblies are preferably metal and are adapted to be erected and collapsed with respect to the underside of the beam.

Figure 2:
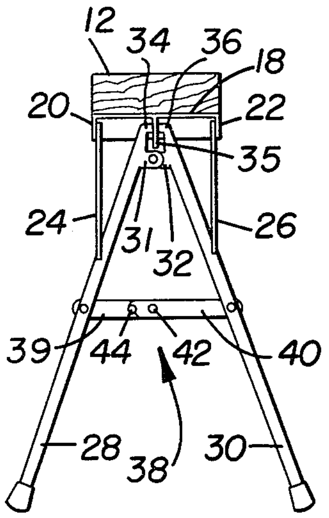
FIG. 2 is an end elevational view showing the leg and brace connection to the frame and beam of the sawhorse.

FIG. 2 provides an end view of the sawhorse illustrating a leg assembly in erected position. As shown, a frame member 18 is fixed by suitable means to the underside of the beam 12 and is adapted with projecting ears 20 and 22 to which are pivotally connected a pair of braces 24 and 26 at one end of each brace. The other end of each brace 24 and 26 is pivotally connected to a pair of legs 28 and 30. Legs 28 and 30 are pivotally attached in a hingelike manner at one end thereof through the connection of flanges 31 and 32. And, at that same end, the legs are each formed to establish a doglike structure at 34 and 36. A rib member 35 is fixed to the underside of the frame 18 and a cutout portion therein at 37 provides a hole for accommodating the dogs 34 and 36.

Intermediate the length of the legs 28 and 30 a cross member 38 is provided constituting members 39 and 40 each pivotally mounted to a leg at one end and pivotally connected to each other near the other end at 42. A spring biased locking pin 44 is provided in member 38 and the matching end of member 40 is formed with a detent at 46 to cooperate with pin 44 to provide a spring lock for the cross member.

From the foregoing description of the parts of the sawhorse of the present invention, it should be readily understood how the parts cooperate to place the sawhorse in erected position. Legs 28 and 30 are spaced apart from their free ends and moved about the pivotal connection with braces 24 and 26 to locate dogs 34 and 36 in position to be inserted into hole 37 in rib 35 of frame 18. In that position the legs are further spread to lock dogs 34 and 36 in hole 37 and to spring cross member 38 into position with pin 44 on member 39 cooperating with detent 46 on member 40. The erected leg assembly now has a rigid triangular connection for each leg (i.e. leg 30, brace 26 and frame 18). The locking dogs and locking cross member forms another triangular connection for the legs (i.e. leg 28, leg 30, dogs 34 and 36 are locking cross member 38). The cross member 38 prevents spreading of the legs because of the rigid pivotal connection between members 39 and 40 with each other and with the legs 28 and 30.

Figure 4:
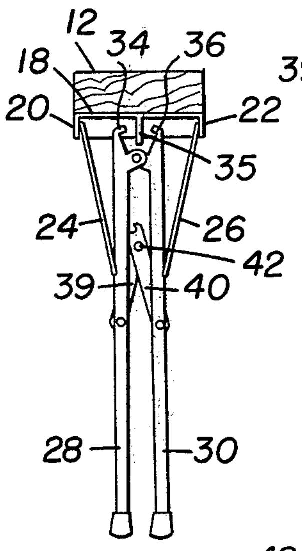
FIG. 4 is an end elevational view showing the leg and brace relation as the sawhorse is being collapsed.

The sawhorse is easily collapsed by reversing the erecting procedure. To collapse the sawhorse, the legs 28 and 30 are spread apart until the spring biased pin 44 comes out of the detent 46 permitting cross member 38 to collapse. As shown in FIG. 4, the members 39 and 40 of cross member 38 pivot upward toward the beam 12 and dogs 34 and 36 withdraw from the hole 37 in rib 35. The leg assembly is then in a condition to be pivoted about the two pivotal connections first between braces 24 and 26 and ears 20 and 22 of frame 18 and second between the braces 24 and 26 and legs 28 and 30.

Figure 3:
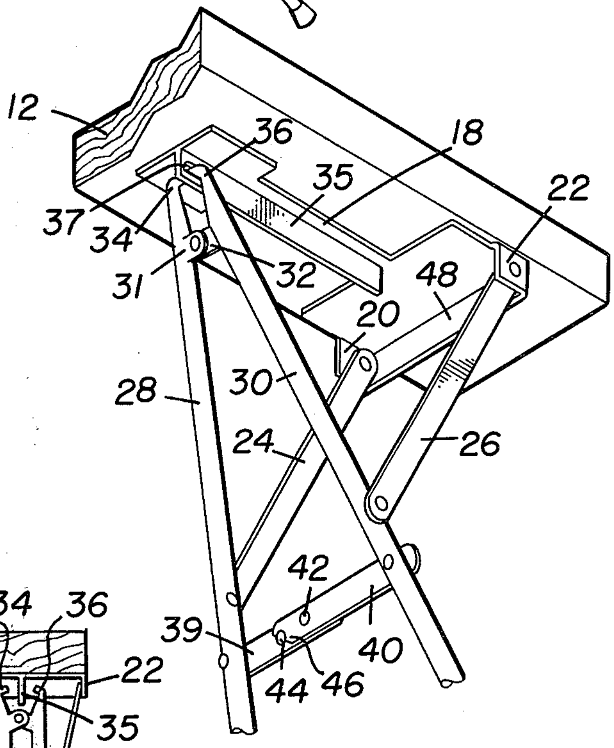
FIG. 3 is a perspective view from below and to one side of the sawhorse showing the leg connection in the erected position.
Figure 5:
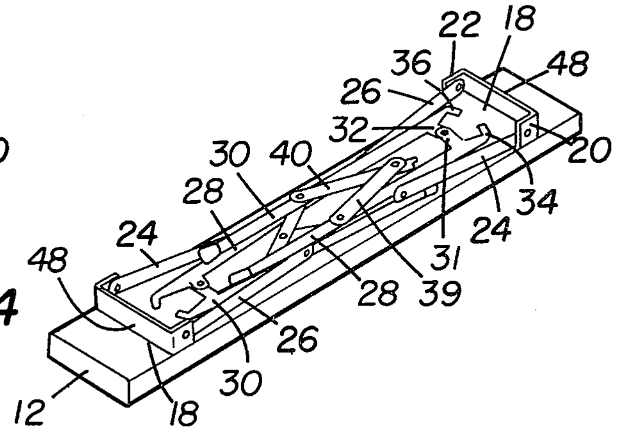
FIG. 5 is a perspective view showing the sawhorse in collapsed condition with the legs and braces stored adjacent to the underside of the beam.
Figure 6:
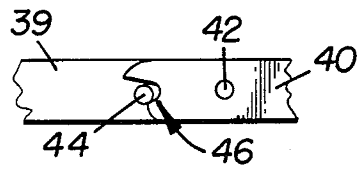
FIG. 6 is an enlarged partial assembly view of the cross member spring locking arrangement.

FIG. 5 illustrates the sawhorse leg assemblies in their perferred collapsed and stored position adjacent to the underside of the beam 18. As more easily visualized by referring to FIGS. 3 and 4, when dogs 34 and 36 are removed from hole 37 the legs 28 and 30 may be aligned with the braces 24 and 26 and, because the braces are longer than the dimension between the dog ends of the legs and pivotal connection position between the braces and the legs, the dog end of the legs may be rotated toward the end of the frame near ears 20 and 22. After that rotation the free end of legs 28 and 30 may be rotated away from the end of the beam to which they are connected and may be located adjacent to the underside of the beam and pointing to the opposite end thereof. With both leg assemblies collapsed, the entire sawhorse is collapsed and the legs with their braces and locking elements are stored in a convenient location while still fixed to the beam or working surface. An end flange 48 on frame 18 encloses the collapsed leg assemblies, protects the pivotal connection of the braces and legs and provides additional strength for the assembly when erected.

While certain preferred embodimemts of the invention have been specifically disclosed, it should be understood that the invention is not limited thereto as many variations will be readily apparent to those skilled in the art and the invention is to be given broadest possible interpretation within the terms of the following claims.

I claim:

1. A collapsible sawhorse including a beam member and a pair of leg assemblies adapted to support the beam and sawhorse and to be collapsible to a stored position adjacent a surface of said beam, the improvement comprising:

a pair of frame members mounted to the undersurface of said beam member one near each end thereof, each frame including a generally central rib member at one end thereof and aligned with the longitudinal axis of said beam, a cutout portion in said rib defining a locking hole, a pair of ears at the opposite end of said frame, said opposite end of said frame being adjacent to an end of said beam, a pair of braces pivotally mounted at one end to each of said frames at said ears, one brace being mounted to each ear of each frame, leg members pivotally mounted at a position intermediate the length thereof to the other end of each of said braces so as to establish a pair of legs supported on said frames at each end of said beam, a doglike structure at one end of each of said legs, said doglike structure being adapted to be positionable within said locking hole in said rib of said frame, said locking hole accommodating said doglike structure from a pair of said legs at each end of said beam, a collapsible cross member pivotally mounted to said leg members at a position intermediate the length thereof and in the vacinity of said pivotal mounting of said leg members to said braces, said cross member including a self-locking means for spreading said leg members and maintaining said doglike structures within said locking holes, said frames, braces, leg members and cross members being so mounted to each other at said pivotal mountings to form said leg assemblies and to permit said leg assemblies to be collapsible and positioned adjacent to the surface of said beam where said frame is attached.

2. The sawhorse of claim 1 wherein said leg members form an A-frame shape with said pair of legs being pivotally joined near one end and having said doglike structures projecting beyond said pivotal joint of said legs, and said cross member forming the brace of said A-frame shape.

3. The sawhorse of claim 1 wherein said frame, legs and braces form a triangle shape when said doglike structure on said legs are fixed to said frame and erected, and said frame, legs and braces are generally positioned in a plane parallel to said beam when collapsed and stored adjacent to said beam.

4. The sawhorse of claim 1 wherein said legs when connected to said doglike structures engaging said frame have their free ends extending beyond said beam, and when said legs are collapsed and stored adjacent to said beam said free end of said legs are directed toward the center of said beam.

5. The sawhorse of claim 1 wherein said collapsible cross member comprises a pair of members pivotally joined to each other adjacent one end and separately pivotally mounted to said leg members at the other end thereof, a spring biased pin mounted on one of said pair of members, and a detent structure formed in the other of said pair of legs in a position to cooperate with said pin to form said self-locking means.

6. The sawhorse of claim 1 wherein said legs when arranged with said doglike structure engaging said frame have their free ends spaced laterally a distance wider than said beam and with one leg on each side of said beam, and when said legs are collapsed and stored said legs are within the lateral width of said frame and spaced laterally a distance narrower than said beam.

* * * * *